April 10, 1951     F. E. HANSEN     2,548,528
VALVED HOSE COUPLING
Filed Aug. 31, 1948

INVENTOR.
FRED E. HANSEN
BY Hudson, Boughton,
Williams, David & Hoffmann.
ATTORNEYS April 10, 1951 D. C. HARVEY 2,548,529
CAMERA PART LATCHING AND GUIDING CONSTRUCTION
Filed Jan. 29, 1948
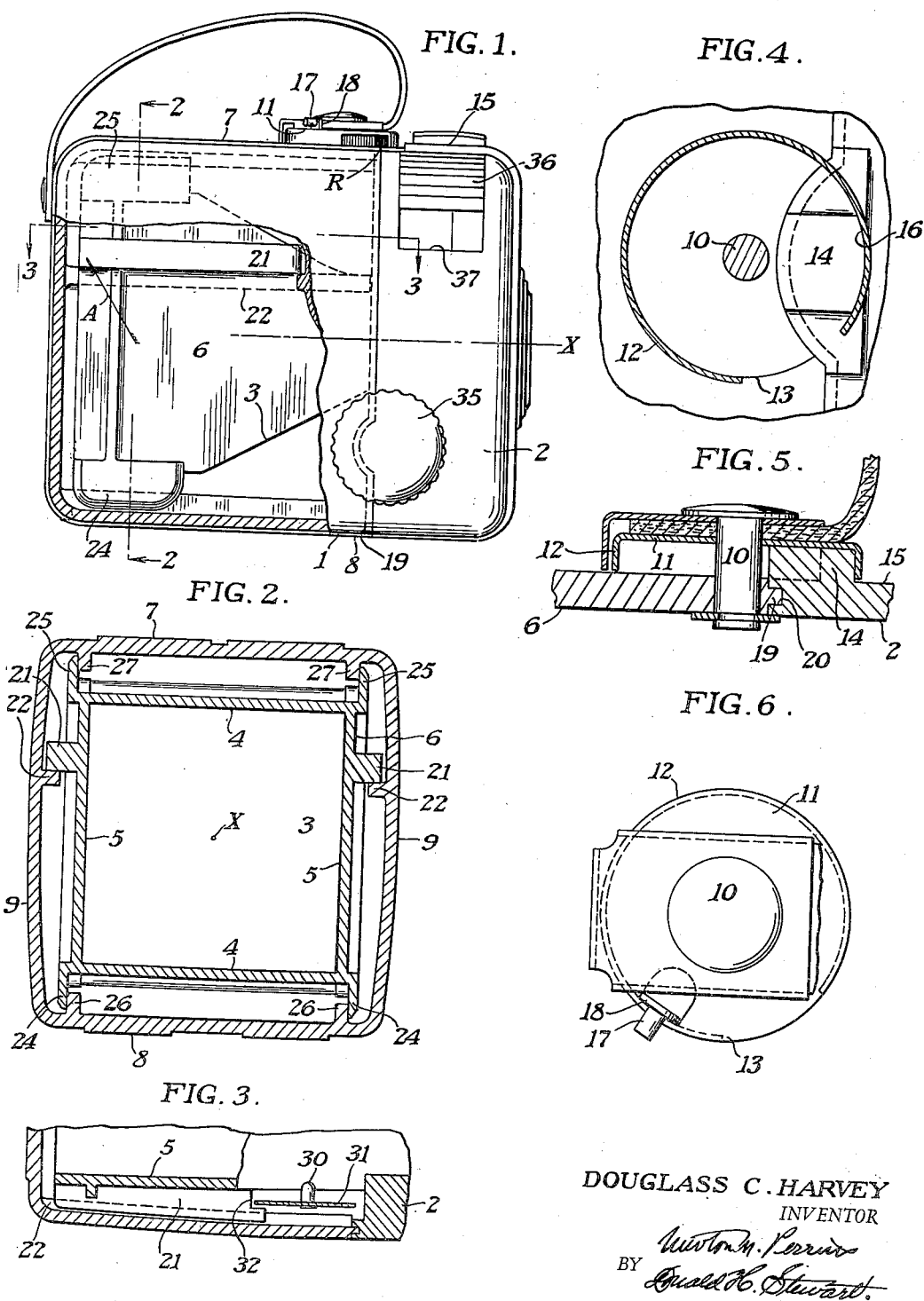
DOUGLASS C. HARVEY
INVENTOR Patented Apr. 10, 1951

2,548,528

UNITED STATES PATENT OFFICE 2,548,528

VALVED HOSE COUPLING

Fred E. Hansen, Lakewood, Ohio

Application August 31, 1948, Serial No. 46,954

2 Claims. (Cl. 284—19)

1

This invention relates to improvements in valved hose couplings, more particularly couplings for fluid lines operating under pressures other than atmospheric pressure and embodying valve means acting automatically to close the line on one or both sides of the coupling when the coupling is broken and to open the line on one or both sides when the coupling is made.

One of the objects of the invention is the provision of a coupling of the character stated which shall interpose a minimum of interference with the flow of fluid therethrough.

Another object is the provision of a coupling of the type indicated which shall be simple and economical from the standpoints of manufacture and assembly.

Still another object is the provision of such a coupling, the members of which may be connected or disconnected quickly and easily.

Other objects and features of novelty will appear as I proceed with the description of that embodiment of the invention which, for the purposes of the present application, I have illustrated in the accompanying drawing, in which.

Figures 2, 3:
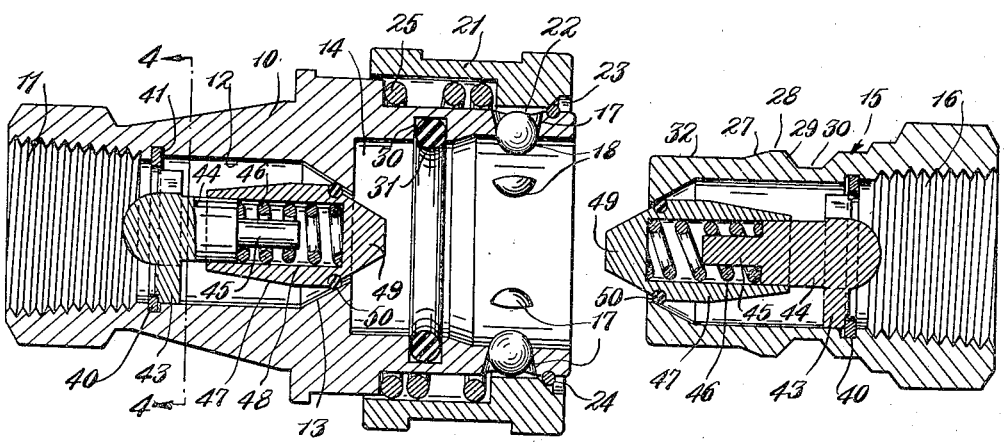
Fig. 2 is a longitudinal central sectional view of the female member of the coupling.
Fig. 3 is a similar view of the male member.

Referring first to Fig. 2 of the drawing, the body portion of the female member of the coupling is shown at 10. It may be provided with threads 11 or other suitable means for attachment to a hose or other fluid conductor. Within the body member there is a smooth bore 12 which at its forward end merges with a frusto-conical valve seat 13. On the opposite or forward side of this valve seat there is a chamber 14 which is considerably larger in diameter than the bore 12 and is adapted to receive the forward extremity of a male member 15 which may be likewise threaded, as at 16, for connection with a hose line or other fluid conductor.

The body member 10 is provided with a plurality of holes 17 to receive steel balls 18, the inner ends of the holes being of somewhat less diameter than that of the balls in order to prevent the balls from passing inwardly through the holes when the coupling is disconnected. These balls are adapted to enter a groove 20 in member 15 when the members are brought into

Figure 1:
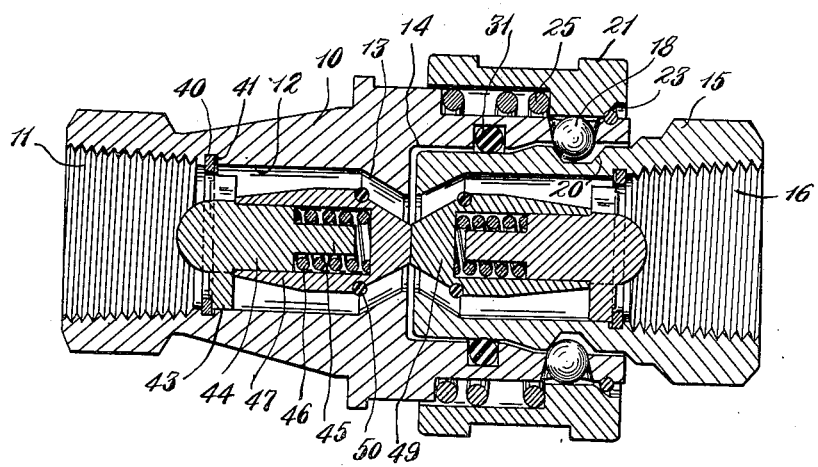
Fig. 1 is a central longitudinal sectional view of a coupling in operative or connected condition.

2 operative or connected position, as indicated in Fig. 1.

Surrounding and slidable upon the exterior surface of body member 10 there is a sleeve 21 which has an inwardly projecting annular surface 22 that serves to engage the balls 18 and lock them in the groove 20 when the coupling is connected. 23 is an annular rabbet or recess. A split ring 24 mounted in a groove in body member 10 prevents sleeve 21 from moving to the right beyond the position illustrated in the drawing. The sleeve is normally held in engagement with split ring 24 by a coil spring 25 which bears against a shoulder on the body portion 10 and a shoulder on the sleeve 21. When the sleeve is drawn to the left against the action of spring 25 recess 23 may be brought into line with the balls 18, when the balls may be cammed outwardly.

Coupling member 15 is provided with an annular bevel 27 and an annular land 28. The forward side of groove 20 is also beveled as shown at 29. Opening into the chamber 14 of the body member 10 there is an annular recess or groove 30 in which is mounted a soft rubber ring gasket 31 which is adapted to ride upon the smooth forward portion 32 of member 15 when the two members are brought into connecting position, thereby sealing the joint between the members.

When the members are to be connected together the operator retracts sleeve 21 against the action of spring 25 and inserts member 15 into the chamber 14. During this operation the bevel surface 27 cams the balls 18 outwardly onto the land 28, and then groove 20 is brought into line with the balls after which the operator releases sleeve 21 and spring 25 forces it to the illustrated position where the surface 22 prevents the balls from leaving the groove 20, and the two coupling members are thereby locked together.

In the illustrated embodiment both of the coupling members are provided with valves which close when the coupling is broken and which engage each other to open up a passage through the coupling when the members thereof are brought into operative relation. The invention in its broader aspects however contemplates the use of a single such valve in one only of the coupling members. As these valves and their mounting are of identical form, a description of one only will suffice.

Figure 4:
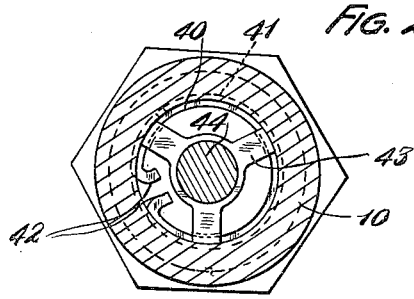
Fig. 4 is a cross-sectional view taken substantially on the line 4—4 of Fig. 2.

40 is a split spring ring which is adapted to be set into a groove 41 in a coupling member. This split ring preferably has inwardly bent ends 42, Fig. 4, to facilitate its removal in the event that the valve needs replacement. Ring 40 projects into bore 12 a sufficient distance to form an abutment for the arms of a spider 43 which sets loosely within bore 12. From the central part of this spider a mandrel 44 projects forwardly. Preferably spider 43 and mandrel 44 are cast integral, but they may be formed separately if desired. Spider 43 forms the sole support for the mandrel, and accordingly I term the latter a cantilever mandrel. It has a reduced forward extremity 45 forming a pilot for a coil spring 46 which is interposed between the mandrel and a valve piece 47. In the illustrated embodiment this valve piece is hollow and has a skirt portion which surrounds and is slidable upon the mandrel 44, the coil spring 46 being contained within the cylindrical bore 48 of the valve piece and tending to press the latter forward toward the valve seat 13. The forward extremity 49 of the valve piece is formed as a frustum of a cone. At the base end of the cone an annular groove is cut in the valve piece in which is mounted a soft rubber ring 50. This ring is vulcanized to the valve piece, vulcanization being the only procedure that I have found to be satisfactory for securing the ring against being torn loose where high pressure fluids are being handled.

*Operation.*—The method of using the coupling of the present invention will be obvious for the most part to persons skilled in the art. When the two members of the coupling are to be connected together the operator takes the female member 10 in one hand and with the fingers and thumb of that hand draws the sleeve 21 back against the action of spring 25. He then inserts the male member 15 into the chamber 14 until the bevel 27 engages the balls 18. Thereafter he may release the sleeve 21, whereupon the spring 25 will cause the recess 23 to bear against the balls and hold them against the bevels 27. Next the two coupling members are forced together, causing the ends 49 of the valve pieces to engage each other and then to compress springs 46. As soon as the two coupling members are forced together to the extent that the valve pieces have assumed the position of Fig. 1, leaving clear and unobstructed annular passages between the valve pieces and their seats, the balls 18 will drop into the groove 29 and the spring 25 will snap the sleeve 21 into locking position as shown in Fig. 1. It may be noted that the springs 46 have the double function of urging the valve pieces forward toward their seats and pressing the spiders 43 rearwardly against the snap rings 40.

The illustrated construction, embodying the cantilever mounting of both valve pieces is an important feature of the invention. A given radial distance separating the valve pieces from the inner walls of the coupling members provides greater cross-sectional passage area than the same distance near the center would do. Hence the cantilever mounting of the valve pieces, leaving an unobstructed annular passage inside the coupling walls, is an improvement over constructions in which a valve piece or valve pieces have slide bearing within those walls.

When the coupling is to be disconnected the operator draws sleeve 21 back against the action of spring 25 whereupon the valve springs 46 acting together initiate the separation of the coupling members and cause the balls 18 to ride up the bevel surface 29 onto the land 28, after which a light pull will complete the movement of separation.

Having thus described my invention, I claim:

1. In a valved coupling for fluid lines, a coupling member, a frusto-conical valve seat in said member, a spider mounted in said member spaced rearwardly from said seat, a cantilever mandrel centrally carried by said spider projecting forwardly toward said seat, a valve piece having a sleeve portion slidably mounted on said mandrel, said sleeve portion being spaced inwardly from the internal wall of said member, a coil spring disposed within the sleeve bearing at its rear end against said mandrel and at its forward end against said valve piece, the inner surface of said sleeve and the outer surface of said mandrel being of substantially the same diameter as the over-all diameter of said spring, whereby the inner surface of said sleeve functions as a guide for said spring as well as a slide guide for said valve piece.

2. In a valved coupling for fluid lines, a coupling member, a frusto-conical valve seat in said member, a hollow valve piece adapted to engage said seat, a spider mounted in said member spaced rearwardly from said seat, a cantilever mandrel centrally carried by said spider projecting forwardly toward said seat, said mandrel having a body portion and a reduced forward portion, a coil spring surrounding the reduced end of said mandrel and interposed between the body portion thereof and said valve piece for pressing the latter toward its seat, said valve piece having a sleeve portion slidable on the body portion of said mandrel and on the external surfaces of said coil spring, the interengaging surfaces of said sleeve and the body portion of the mandrel being of substantially the same diameter as the over-all diameter of said spring.

FRED E. HANSEN.

REFERENCES CITED

The following references are of record in the file of this patent:

UNITED STATES PATENTS

| Number | Name | Date |
|---|---|---|
| 1,493,306 | Wilkinson | May 6, 1924 |
| 1,732,828 | Bijor | Oct. 22, 1929 |
| 1,811,166 | Yardley | June 23, 1931 |
| 2,299,847 | Price | Oct. 27, 1942 |
| 2,322,449 | Johnson et al. | June 22, 1943 |
| 2,339,101 | Parker | Jan. 11, 1944 |
| 2,393,489 | Trautman | Jan. 22, 1946 |
| 2,461,705 | Strandberg | Feb. 15, 1949 |

FOREIGN PATENTS

| Number | Country | Date |
|---|---|---|
| 863,152 | France | March 25, 1941 |